US010986854B2

(12) United States Patent
Klevakin

(10) Patent No.: US 10,986,854 B2
(45) Date of Patent: Apr. 27, 2021

(54) MODULAR INSTALLATION FOR PROCESSING BULK GRAIN PRODUCTS WITH ULTRAVIOLET RADIATION

(71) Applicant: Ruslan Vladimirovich Klevakin, Moscow (RU)

(72) Inventor: Ruslan Vladimirovich Klevakin, Moscow (RU)

(*) Notice: Subject to any disclaimer, the term of this patent is extended or adjusted under 35 U.S.C. 154(b) by 0 days.

(21) Appl. No.: 15/747,120

(22) PCT Filed: May 11, 2017

(86) PCT No.: PCT/RU2017/000302
§ 371 (c)(1),
(2) Date: Jan. 23, 2018

(87) PCT Pub. No.: WO2017/196209
PCT Pub. Date: Nov. 16, 2017

(65) Prior Publication Data
US 2019/0075827 A1    Mar. 14, 2019

Related U.S. Application Data

(63) Continuation of application No. PCT/RU2017/000302, filed on May 11, 2017.

(30) Foreign Application Priority Data

May 11, 2016 (RU) ................ 2016118174

(51) Int. Cl.
*A23L 3/28* (2006.01)
*A23B 9/06* (2006.01)
(Continued)

(52) U.S. Cl.
CPC .............. *A23L 3/28* (2013.01); *A01C 1/00* (2013.01); *A23B 9/06* (2013.01); *A23L 3/0055* (2013.01)

(58) Field of Classification Search
CPC ...... A23L 3/0055; A23L 3/28; A23L 3/34095; A23L 3/40; A23L 3/54; A23B 9/06;
(Continued)

(56) References Cited

U.S. PATENT DOCUMENTS 6,132,784 A * 10/2000 Brandt .................. A23B 7/015
422/186.3
10,548,332 B2 * 2/2020 Dobrinsky ................ A23L 3/28
(Continued)

FOREIGN PATENT DOCUMENTS

| DE | 3828185 A1 | 2/1990 |
| RU | 2228120 C2 | 5/2004 |
| RU | 2475010 C2 | 2/2013 |

OTHER PUBLICATIONS

International Search Report and Written Opinion for PCT/RU2017/000302, dated Nov. 16, 2017, 8 pages.

*Primary Examiner* — Sarang Afzali
*Assistant Examiner* — Darrell C Ford
(74) *Attorney, Agent, or Firm* — Bardmesser Law Group

(57) ABSTRACT

A device for processing bulk grain products includes a housing with a plurality of modules stacked on top of each other; wherein the modules are at an equal distance from each other, such that the distance is adjustable, wherein each module has horizontal ultraviolet lamps, whose position relative to each is adjustable, and each ultraviolet lamp has a protective coating for protection from mechanical damage and a protective shield above it; each module having an ultraviolet intensity sensor aimed at one of the plurality of lamps; each module having a device for cleaning the ultraviolet lamps from contamination; and each module including a vibrating mechanism; wherein the bulk grain products move from top to bottom, past the ultraviolet lamps under a force of gravity. Optionally, the device may include a bipolar ionizer and/or an infrared heater. Optionally the protective coating is made of polytetrafluoroethylene.

14 Claims, 6 Drawing Sheets

Figure 1:
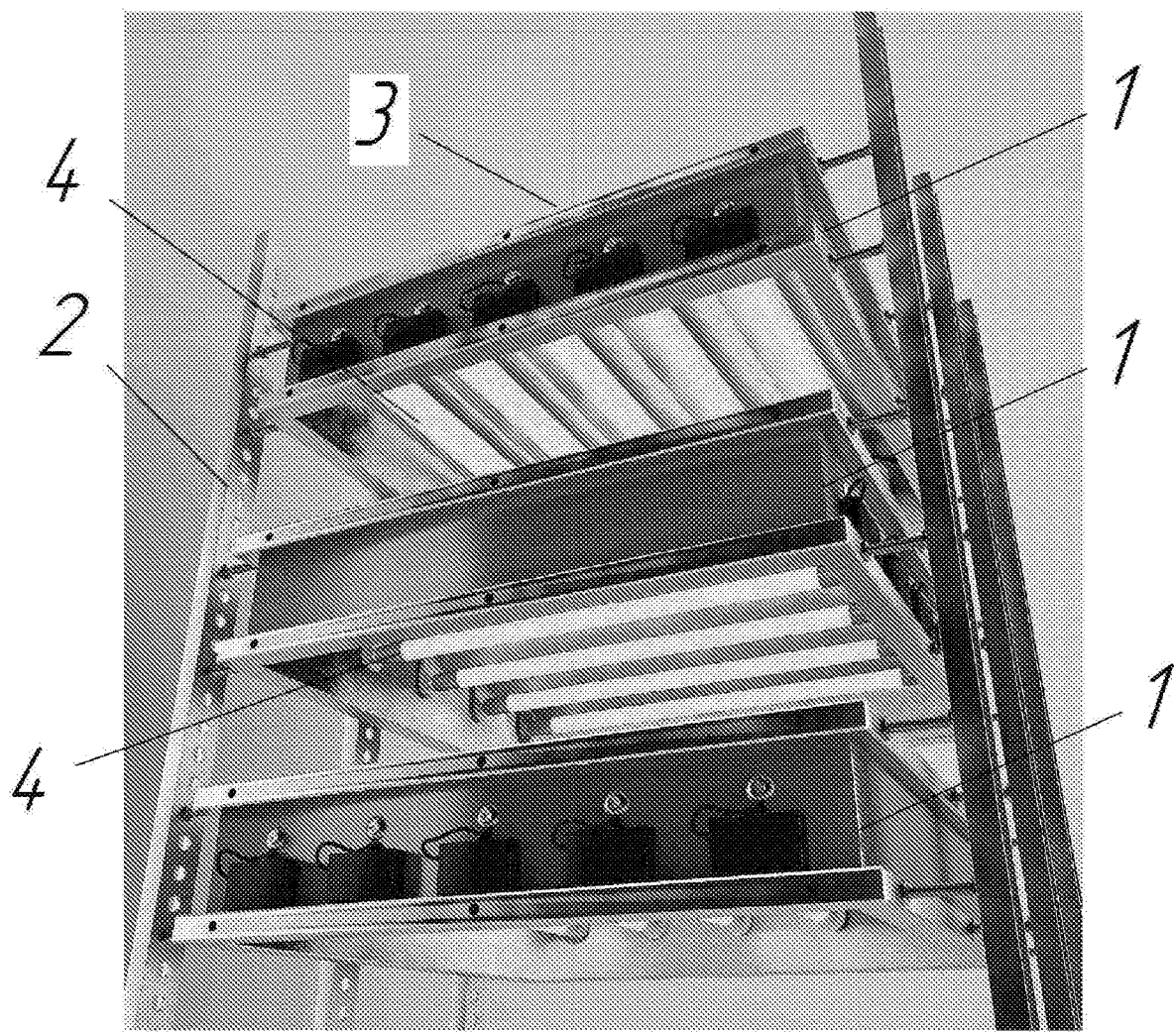

(51) Int. Cl.
 *A01C 1/00* (2006.01)
 *A23L 3/005* (2006.01)
(58) Field of Classification Search
 CPC .... A23B 9/22; A23B 7/02; A01C 1/00; A01C 1/08; A23K 3/00
 USPC .......................................................... 99/451
 See application file for complete search history.

(56) References Cited

U.S. PATENT DOCUMENTS

| | | | | |
|---|---|---|---|---|
| 10,669,166 | B2* | 6/2020 | Liao | C02F 1/008 |
| 2002/0040643 | A1* | 4/2002 | Ware | A23B 7/0205 |
| | | | | 99/467 |
| 2004/0156959 | A1* | 8/2004 | Fink | A23L 3/26 |
| | | | | 426/248 |
| 2009/0189085 | A1* | 7/2009 | Rogers | A23L 3/28 |
| | | | | 250/455.11 |
| 2010/0183779 | A1* | 7/2010 | Felix | A23B 7/015 |
| | | | | 426/231 |
| 2012/0093687 | A1* | 4/2012 | Snowball | A61L 2/14 |
| | | | | 422/23 |
| 2014/0013962 | A1* | 1/2014 | Lipton | B33Y 30/00 |
| | | | | 99/353 |
| 2014/0060095 | A1* | 3/2014 | Shur | A61L 2/10 |
| | | | | 62/129 |
| 2015/0125355 | A1* | 5/2015 | Lee | B65D 81/2076 |
| | | | | 422/186.3 |

\* cited by examiner

MODULAR INSTALLATION FOR PROCESSING BULK GRAIN PRODUCTS WITH ULTRAVIOLET RADIATION

BACKGROUND OF THE INVENTION

Field of the Invention

The invention relates to devices for disinfecting bulk materials, in particular grain and grain products, with the help of ultraviolet radiation. The technical solution can be used in the food, microbiological, pharmaceutical, pharmacological, cosmetic, agricultural, livestock, poultry, and in production of ecologically clean food products.

Description of the Related Art

The processing of materials by radiation of the ultraviolet spectrum for the purpose of decontamination and bactericidal purification, as well as various devices for this purpose are widely known, in particular, irradiation with ultraviolet radiation of seeds of cereals for cleaning from harmful microorganisms is known and used (RU Patent 1 2318 305). Known devices are shaft type [2]—patent RU 9514, [3]—patent RU 2228120), drum type ([4]—patent RU 82510, [5]—patent RU 2537500) conveyor type [6]—RU patent 2475010).

In the method of presowing treatment of wheat seeds, including irradiation of seeds with ultraviolet radiation [1], an apparatus for irradiating and treating seeds is described. The device for irradiation and seed treatment includes a seed hopper, an irradiation chamber (body) for irradiating slatted boards (protective shields) for seeds (loose material) arranged at an angle on opposite walls, and emitters of the ultraviolet range (ultraviolet radiation lamps).

In the described device [1] there are no means for cleaning the lamps from contamination, which can lead to a decrease in the radiation flux and the dose of ultraviolet irradiation, ultraviolet intensity sensors are not provided. Lamps do not have protection against mechanical damage. The body has one-piece construction, its design does not provide possibility for adjusting the intensity of treatment with ultraviolet radiation, depending on the type of material being processed, by changing the number of lamps, the distance between them, and the speed of incidence of particles. There is no possibility to regulate the speed of passage of loose material by changing the clearance between sloping boards (protective shields). It is not possible to process bulk material simultaneously from all sides. The heating of the base of the lamp cap and the removal of static electricity generated by the friction of particles of bulk material are not provided.

A device for drying grain [2] is known, comprising a drying chamber (housing) with horizontally arranged grain reflectors (protective shields), a source for heat generation (lamps), noria (charging mechanism) for loading grain into a dryer and a sloped board. Horizontal grain reflectors are placed at an angle to each other, with the angle in the lower row of reflectors greater than the previous one, and the heat source for drying and irradiating pests are electric bulbs. Lamps are not placed in each row of reflectors. In separate rows, light bulbs with harmful radiation for pests are installed.

In this device [2], there is no provision for installing ultraviolet lamps with a TEFLON polytetrafluoroethylene, available from DuPont). protective coating, and no type of radiation is indicated. The body is made integral and it does not allow to adjust the radiation dose by installing or removing lamps or moving them freely. It does not contain elements for monitoring the intensity of irradiation and cleaning the lamps from contamination. There is no possibility for adjusting the gap between the grain reflectors (protective guards). The heating of the base of the lamp cap and the removal of static electricity generated by the friction of the particles of the material are not provided.

A unit for the processing of bulk products with ultraviolet (UV) radiation is known [3] containing a loading and unloading device, an operating element and UV lamps enclosed in covers transparent for UV radiation and located inside the working organ. UV lamps are placed parallel to each other in horizontal and vertical rows with equal intervals in horizontal rows and successively decreasing intervals in vertical rows. The loading device is connected to a closed discharge conduit. UV lamps are equipped with a device for cleaning them. In the working organ, a UV-radiation intensity sensor is installed, aimed at one of the lamps.

This unit [3] is closest in nature and is selected as a prototype. The disadvantages of its design are as follows.

The design of the unit is solid, all lamps are rigidly installed in a single housing. There is no possibility for adjusting the unit for different kinds of bulk products as needed. It is difficult to change the capacity of the installation without reworking the case. There is no possibility of slowing down the rate of falling of the bulk product, which leads to an increase in the number of UV lamps installed in the installation. The unit has much larger dimensions, since the possibility of multiple processing of a single portion of the bulk product requires the installation of additional mechanisms and machines. It does not allow changing the number of ultraviolet lamps by changing or installing any group of lamps mounted by a separate module. It does not allow to select irradiation intensity depending on the material being passed by simple addition or reduction of modules with lamps. It is not enough to protect the lamps from damage, protective shields are installed only above the top row of lamps. Quartz covers do not provide reliable protection of lamps, since they are brittle. There is no possibility to adjust the clearance between the shields. The removal of static electricity from friction particles of the material is not ensured. The device assumes a mechanical effect on their surfaces for cleaning the covers, and the rubbing of the particles can damage the cover.

The technical task, on the solution of which is directed the invention, is to provide processing of bulk material, in particular, grain product, with ultraviolet irradiation with the possibility of adjusting the intensity of irradiation. Providing the movement of bulk material due to gravity with the ability to adjust the flow rate. Ensuring uniform irradiation of particles of bulk material simultaneously from all sides. Ensuring the convenience of transportation, installation, repair and operation, neutralization of static electricity. The installation should be constructively simple and should provide the possibility of increasing the productivity by assembling standard elements.

SUMMARY OF THE INVENTION

The technical result consists in providing passage of bulk material (grain product) between ultraviolet lamps under the influence of gravity and cleaning it from harmful microorganisms with the possibility of regulating the flow velocity of particles of bulk material and controlling the intensity of irradiation.

The technical result is achieved by the fact that a modular installation for processing bulk grain products with ultraviolet radiation consists of successively arranged one above the other identical modules, the module consists of a rectangular body or housing, wherein inside the housing at an equal distance from each other, horizontally, with the possibility of adjusting the mutual position, lamps of ultraviolet radiation are installed, equipped with a protective, transparent for ultraviolet radiation, TEFLON coating adjacent to the lamp glass and equipped on the top with a protective shield to protect from the product being poured, the module has an lamps ultraviolet intensity sensor aimed at one of the lamps, as well as a device for cleaning the lamps from contamination, the modules are mounted on racks, with the possibility of adjusting the distance between modules, racks are fixed on a frame equipped with a vibrating mechanism.

The above-mentioned essence ensures achievement of the declared technical result.

The protective shield is made in the form of a corner (L-shaped cross section) or channel (U-shaped cross section) and is made of metal or a composite material.

To eliminate blockages from the spilled product inside the modules, it is necessary to give a slight vibration either to each protective shield (corner) individually, or to the entire installation as a whole.

The vibrating mechanism for the entire installation contains a base and a vibration motor, while the frame is mounted on the base by means of a damper, and the vibration motor is fixed to the frame.

To operate the unit at low outside temperatures, the UV lamp bases are warmed by means of an infrared source. UV lamps in adjacent modules are located crossing (crosswise) in relation to each other.

The device for cleaning the lamps contains a pneumatic fitting installed on the module body in the holes. The unit contains a bipolar ionizer for the removal of static electricity from each module.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 2:
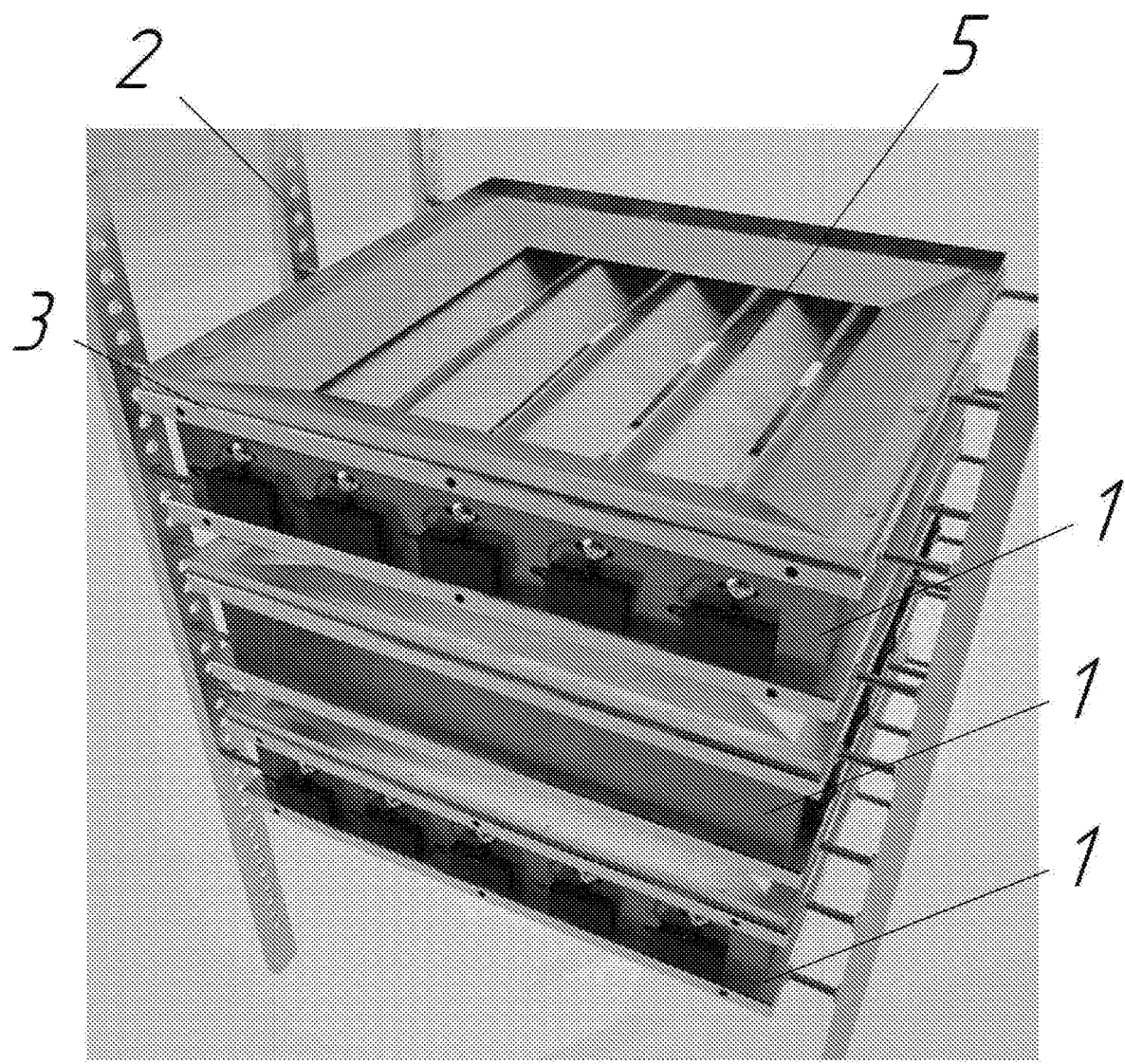
Figure 3:
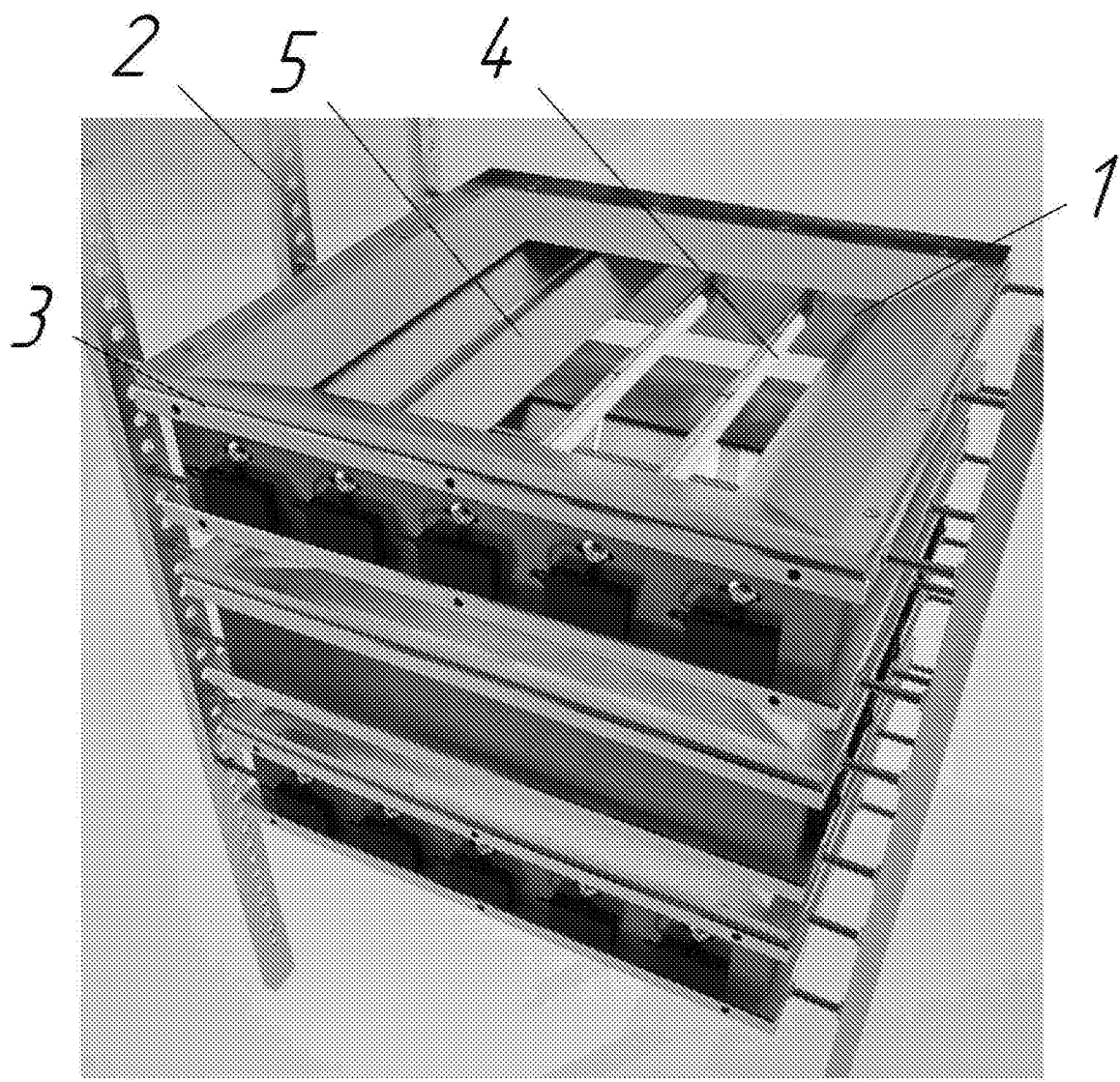
Figure 4:
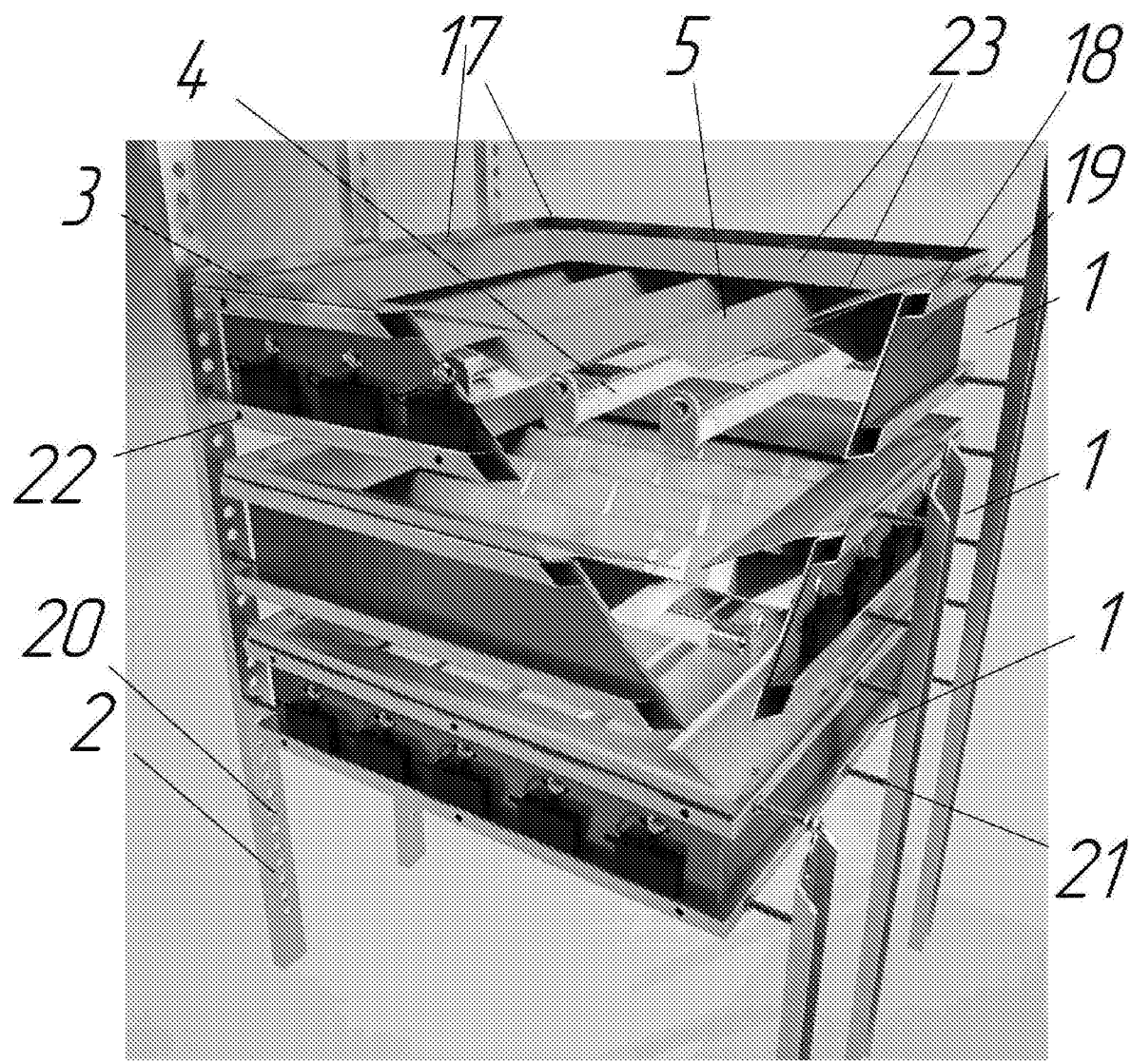
Figure 5:
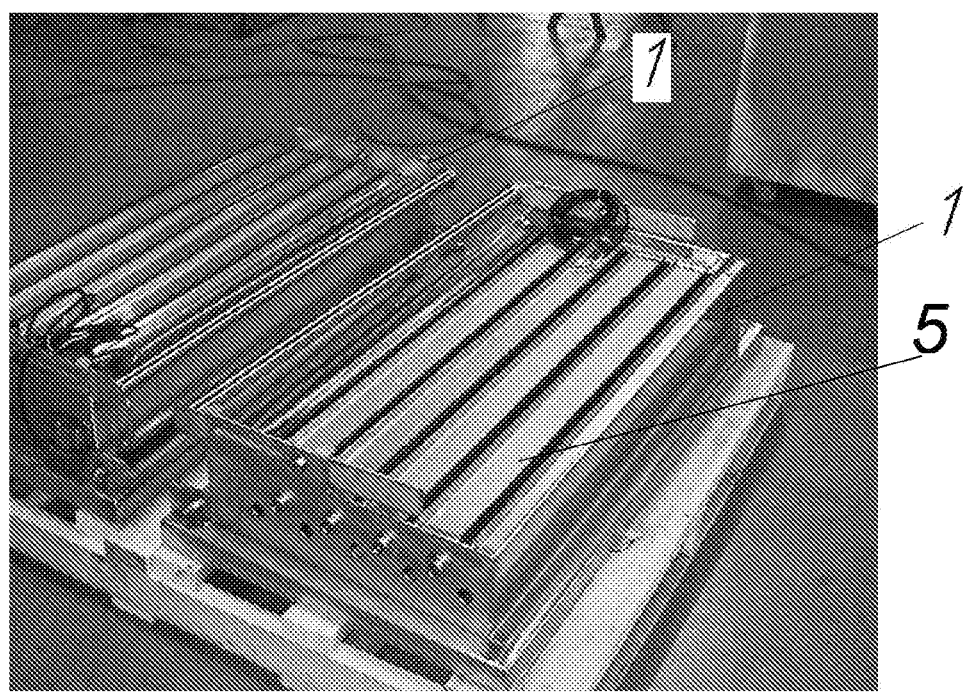

In the drawings:

FIG. 1—a photograph, the general view of the device without a frame, where three modules are visible, installed on the racks;

FIG. 2—a photograph, a general view of the device from the side of the shields, there are three modules on the racks;

FIG. 3—a photograph, the general view of the device from the side of the shields, there are three modules on the racks, where two protective flaps of the upper module are absent;

FIG. 4—a photograph, a general view of the device without a frame, with a partial cutout of the two modules;

FIG. 5—a photograph, two single modules with protective shields in the form of a channel for legumes.

Figure 6:
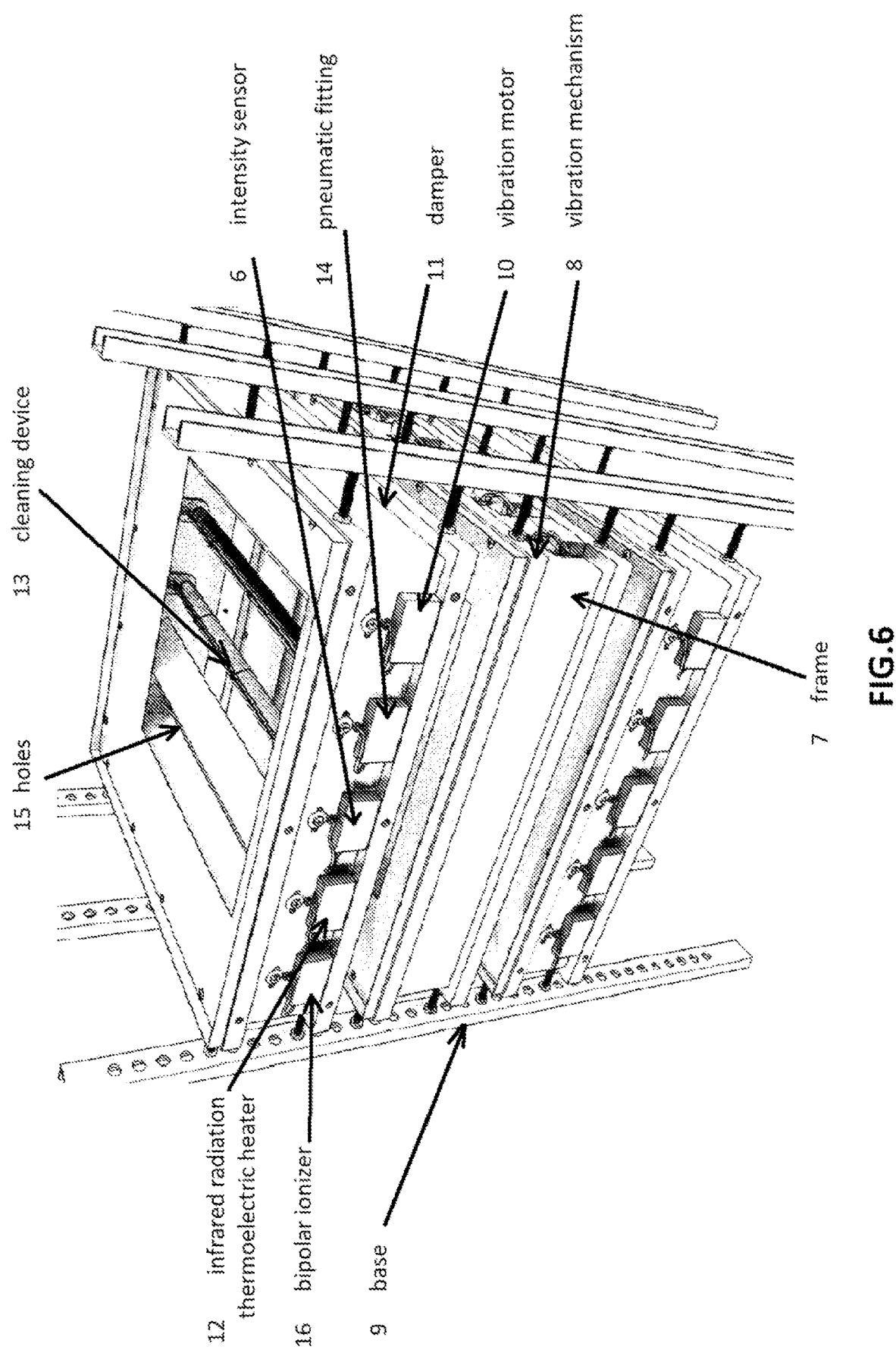

FIG. 6 shows additional detail of the device.

DETAILED DESCRIPTION OF THE PREFERRED EMBODIMENTS

Reference will now be made in detail to the preferred embodiments of the present invention, examples of which are illustrated in the accompanying drawings.

A modular plant for processing bulk grain products with ultraviolet radiation contains three modules 1 (FIGS. 1, 2, 3, 4, 5) mounted on six posts 2 (FIGS. 1, 2, 3, 4). Racks 2 are installed vertically, and modules 1 are arranged in series. The number of racks 2 and modules 1 can be adjusted depending on the required capacity and the type of bulk material to be processed. Module 1 consists of a square body 3 (FIGS. 1, 2, 3, 4) within which at an equal distance (10 cm) from each other, horizontally arranged ultraviolet lamps 4 (FIGS. 1, 3, 4) are installed. Special lamps with UVC type radiation are used which can be used in a wide range of outside temperatures (−35° C. to +40° C.).

Each lamp 4 is equipped with a protective shield 5 (FIGS. 2, 3, 4, 5), which are located at the top of the module 1 above the lamps 4. The protective shield 5 is made in the form of a corner (FIGS. 1, 2, 3, 4) or in the form of a channel (FIG. 5). The protective shield 5 is made of metal. It is possible to make a protective shield 5 made of carbon fiber. The protective shield 5 shields each lamp 4 from the impacts of the particles of the cereal product from the top. In addition, the protective flap 5 above each lamp 4 allows to maintain the equal speed of product spillage through the installation modules 1. The lamp 4 and the protective shield 5 form a single element and are mounted in the housing with the possibility of adjustment.

Each lamp 4 with its flap 5 can be moved in the body 3 with respect to the adjacent lamp 4 with a protective flap 5 located near. Lamps 4 are placed in a protective TEFLON coating that fits snugly against the bulb (glass) of lamp 4. TEFLON coating is transparent to ultraviolet rays and protects the glass (bulb) of lamp 4 from mechanical damage, while allowing easy cleaning of the lamp surface from dust and dirt by supplying compressed air.

As also shown in FIG. 6, Module 1 has an intensity sensor 6 of the ultraviolet radiation from the lamps 4 directed to one of the lamps 4. The racks 2 are fixed to the frame 7 equipped with a vibration mechanism 8. The vibration mechanism 8 comprises a base 9 and a vibration motor 10. The frame 7 is mounted on the base 9 by means of a damper 11, for example made in the form of spring supports, and wheels (not indicated). The vibration motor 10 is fixed to the frame 7. Thus, modules 1 are given a vibration, which ensures uniform precipitation of particles of bulk material (grain product) and absence of blockages. The vibration may be imparted to the plant from the electric motor (not indicated) fixed to the base 9 and through the crank-and-rod mechanism connected to the frame 7.

In each module 1, infrared radiation thermoelectric heater 12 is installed to heat the lamp cap 4. Lamps 4 in adjacent modules 1 are located crossing with respect to each other. Module 1 is equipped with a cleaning device 13 for cleaning lamps 4 from contamination. A device for cleaning 13 lamps 4 comprises a pneumatic fitting 14 mounted on the housing 3 of the module 1 in the holes 15. The installation contains a bipolar ionizer 16 for discharging static electricity from each module 1.

The housing 3 of the module 1 consists of a frame 17 (FIG. 4) made of tubes 18 (FIG. 4) of a rectangular cross-section and flat partitions 19 (FIG. 4). The racks 2 are made in the form of a channel with holes 20 (FIG. 4). The housing 3 is fixed to the posts 2 by the studs 21 (FIG. 4), which are installed in the holes 22 (FIG. 4) of the pipes 18. Lamps 4 are installed in the holes of flat partitions 19. Each module 1 from above can be equipped with pitched plates 23 (FIG. 4) to direct the flow of particles of bulk material. The frame 7 on which the racks 2 with modules 1 are mounted from above is a frame made from a profile pipe and is manufactured individually depending on the range of capacity, capacity of the installation and the type of loose materials.

The work of a modular plant for processing bulk grain products with ultraviolet radiation based on the process of spilling loose material from the top down through modules 1 with lamps 4 of ultraviolet radiation. The lamps 4 are connected to the source of electric current. Lamps 4 emit ultraviolet radiation. A vibratory mechanism 8 is started and for this purpose a vibration motor 10 is started. The vibration motor 10 fixed to the frame 7 transmits vibration to the frame 7, the frame 7 not rigidly connected to the base 9 begins to vibrate (oscillate) on the dampers 11 (rolling on wheels backwards and at the same time held by the springs).

Vibration via frame 7 and posts 2 is transferred to modules 1. Loose material, for example, wheat grain are taken and are poured out on top of module 1. For loading and unloading of the processed material, the plant can be equipped with loading and unloading mechanisms, for example in the form of auger, noria or belt conveyor. Under the force of gravity, particles of bulk material, wheat grains, fall on the protective shields 5 and slide under the influence of weight and vibration into the gaps between adjacent flaps 5.

Pitched plates 23 facilitate the direction of particles of bulk material in the gaps. Depending on the properties of the bulk material, the position of the protective shields 5 is adjusted, together with the lamp 5 installed under it, selecting the optimal gap between the adjacent edges of the protective flaps 5, providing the necessary speed of particle spillage. The possibility of adjusting the protective flap 5 and the gap between adjacent protective flaps 5 makes it possible to adjust the spillage time of the product and its quantity, as well as adjust the dose of ultraviolet irradiation. Particles of bulk material pass through the gap between the shields 5, while vibration does not allow the particles to stop in the gap, forming a clog.

After passing through the gap, between the shields 5, the particles fall and rotate, while ultraviolet radiation from the lamps 4 irradiates the particles. The protective shield 5 protects each lamp 4 from the impact of particles of bulk material that is poured over from above. Sequentially, the particles pass through each module, mounted one above the other, from top to bottom. The TEFLON coating of lamps 4 transmits ultraviolet rays and protects the glass (bulb) of lamp 4 from mechanical damage. Ultraviolet irradiation of lamps 4 acts on the surface of particles of bulk material and disinfects them, sterilizes, cleanses harmful microorganisms (viruses, bacteria, spores, mold, etc.).

The intensity sensor 6 of the ultraviolet radiation from the bulbs 4 directed to one of the lamps 4 makes it possible to control the intensity of the ultraviolet radiation. In this case, the decrease in the intensity of ultraviolet radiation occurs, in particular, as a result of contamination of the TEFLON coating of the lamps 4 and, according to the intensity sensor 6, determine the need for cleaning from dust and dirt. To clean the TEFLON coating of the lamps 4, a cleaning device 13 is used. To the pneumatic fitting 14, pneumatic hoses (not shown) are connected and compressed air is supplied from them by the compressor or receiver.

The compressed air cleans the contamination of the TEFLON coating of the lamps 4. The capacity of the installation as a whole and the degree of cleaning of bulk material spilled from above through the installation depend on the number of modules 1 installed one above the other, as well as on the number of racks 2 and the total number of modules 1. Lamps 4 in adjacent modules are crossed (cross to cross) relative to each other, this allows you to change the direction of the particles and irradiate them more evenly. Static electricity generated during the operation of the unit is removed by a bipolar ionizer. The bipolar ionizer 16 can be mounted on the installation rack 2, one for each module 1. In each module 1, infrared radiation thermoelectric heater 12 is installed which provide heating of the lamp cap 4.

Industrial applicability—the plant has a simple design, it is not difficult to manufacture and does not require sophisticated process equipment, the installation can be manufactured on modern industrial equipment and can be used in agriculture for preseeding of grain seeds and for cleaning grain crops from harmful microorganisms. The use of the invention will make it possible to clean the surface of the purified product as necessary from 20% to 99.99% of bacteria, fungi, spores, harmless to humans, without the use of chemicals, in small quantities and on an industrial scale. The use of the installation in agriculture for presowing treatment improves the germination of cereals, reduces the number of diseases that the crop undergoes from growth to germination to harvest. The use of the plant in poultry and livestock farming reduces the likelihood of disease transmission through the feed and consequently reduces the likelihood of the mortality of birds and animals.

At the same time, the use of a plant for the processing of grain products allows to reduce or abandon completely the use of chemicals and antibiotics.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

The invention claimed is:

1. A device for processing bulk grain products with ultraviolet radiation comprising successively arranged modules, each module comprising:
   a housing that is rectangular in plan view, wherein inside the housing a plurality of lamps of ultraviolet radiation are installed horizontally at equal distance from each other with a possibility of adjusting the mutual position, and are equipped with a protective polytetrafluoroethylene coating that is transparent for ultraviolet radiation, the polytetrafluoroethylene coating adjacent to a lamp glass of each of the plurality of lamps and with each lamp having a protective shield above the lamp;
   an ultraviolet intensity sensor aimed at one of the plurality of lamps; and
   a device for cleaning the plurality of lamps from contamination,
   wherein the modules are mounted on racks such that a distance between modules is adjustable, and
   wherein the racks are fixed on a frame equipped with a vibrating mechanism, and
   wherein the device for cleaning the lamps includes a pneumatic fitting installed on the housing.

2. The device of claim 1, wherein the device comprises the source of infrared radiation.

3. The device of claim 1, wherein the protective shield is made in the form of a corner (L-shaped cross section) or channel (U-shaped cross section) and is made of metal or a composite material.

4. The device of claim 1, wherein the vibrating mechanism contains a base and a vibration motor, herein wherein the frame is mounted on the base by means of a damper, and the vibration motor is fixed on the frame.

5. The device of claim 1, wherein the lamps of ultraviolet radiation in adjacent modules are located crosswise in relation to each other.

6. The device of claim 1, wherein the lamps are positioned such that an entire surface of each grain of the bulk grain products is irradiated as the bulk grain products are moving vertically through the module, from top to bottom, under a force of gravity.

7. A device for processing bulk grain products with ultraviolet radiation comprising a plurality of modules, each module comprising:
- a housing that is rectangular in plan view, wherein inside the housing a plurality of lamps of ultraviolet radiation are installed horizontally at equal distance from each other with their mutual position adjustable, and are equipped with a protective polytetrafluoroethylene coating that is transparent for ultraviolet radiation, the polytetrafluoroethylene coating adjacent to a lamp glass of each of the plurality of lamps and with each lamp having a protective shield above the lamp;
- an ultraviolet intensity sensor aimed at one of the plurality of lamps; and
- a device for cleaning the plurality of lamps from contamination,
- wherein the modules are mounted on racks such that a distance between modules is adjustable, and
- wherein the racks are fixed on a frame equipped with a vibrating mechanism, and
- wherein the device further comprises a bipolar ionizer for the removal of static electricity from each module.

8. A device for decontaminating bulk grain products using ultraviolet radiation, comprising:
- a plurality of modules mounted on a rack, each module having a housing that is rectangular in plan view;
- each housing having a plurality of ultraviolet lamps arranged horizontally at equal distance from each other;
- wherein a position of the ultraviolet lamps is adjustable relative to each other;
- wherein the ultraviolet lamps have a protective polytetrafluoroethylene coating on their glass surfaces;
- each ultraviolet lamp having a protective shield above the ultraviolet lamp;
- an ultraviolet intensity sensor aimed at one of the plurality of lamps of each module; and
- a device including a pneumatic fitting for cleaning the ultraviolet lamps;
- wherein a distance between the modules is adjustable, and
- wherein the rack is fixed on a frame equipped with a vibrating mechanism.

9. The device of claim 8, wherein modules include slots for the bulk grain products to enter, and wherein the slots are oriented crosswise, relative to an adjacent module.

10. The device of claim 8, wherein the vibrating mechanism includes a base and a vibration motor, wherein a frame is mounted on the base by means of a damper, and the vibration motor is fixed on the frame.

11. The device of claim 8, wherein the vibrating mechanism includes a base and a vibration motor, wherein the frame is mounted using a damper.

12. The device of claim 8, wherein the ultraviolet lamps in adjacent modules are oriented crosswise in relation to each other.

13. The device of claim 8, wherein the device for processing bulk grain products further comprises a bipolar ionizer for the removal of static electricity from each module.

14. The device of claim 8, wherein the device for processing bulk grain products further comprises an infrared heater.

* * * * *